United States Patent [19]

Sarrut

[11] 4,177,152

[45] Dec. 4, 1979

[54] METHOD OF EXTINGUISHING METAL FIRES

[75] Inventor: Jean P. Sarrut, La Varenne St. Hilaire, France

[73] Assignees: CECA S.A., Villacoublay; Le Carbone Lorraine, Paris, both of France

[21] Appl. No.: 852,238

[22] Filed: Nov. 17, 1977

[30] Foreign Application Priority Data

Nov. 22, 1976 [FR] France ............................... 76 35125
Sep. 5, 1977 [FR] France ............................... 77 26857

[51] Int. Cl.$^2$ .......................... C09K 3/28; G21C 9/04

[52] U.S. Cl. .......................................... 252/2; 169/47; 176/38; 423/448

[58] Field of Search .................... 252/2; 423/448, 449; 169/47; 176/38

[56] References Cited

U.S. PATENT DOCUMENTS

| | | | |
|---|---|---|---|
| 1,395,073 | 10/1921 | Willey | 252/2 |
| 2,307,083 | 1/1943 | Thrune | 252/2 |
| 2,346,627 | 4/1944 | Thrune | 252/2 |
| 2,388,014 | 10/1945 | Sargent et al. | 252/2 |
| 3,719,608 | 3/1973 | Olstowski | 423/448 |

FOREIGN PATENT DOCUMENTS

| | | | |
|---|---|---|---|
| 991581 | 5/1965 | United Kingdom | 423/448 |

OTHER PUBLICATIONS

Croft, Research (London), vol. 10, 1957, pp. 23 to 28.

*Primary Examiner*—Leland A. Sebastian
*Attorney, Agent, or Firm*—Stevens, Davis, Miller & Mosher

[57] ABSTRACT

In a method of extinguishing metal fires, use is made of exfoliated graphite for isolating the relative burning metallic surface from the ambient atmosphere. Said exfoliated graphite may be obtained in situ starting from graphite complexes able to be exfoliated at the fire temperature range.

22 Claims, No Drawings

METHOD OF EXTINGUISHING METAL FIRES

The invention relates to a method of extinguishing metal fires, especially those fires which are difficult to extinguish by conventional means, such as alkaline metal fires, more particularly sodium fires as well as light metal fires, especially those involving aluminium, magnesium and alloys thereof, and to a composition for said purpose.

Generally the metal fires are characterized by the fact that the temperature of the burning mass is considerably superior to the self-burning temperature, and accordingly the metallic surface must be isolated from the ambient atmosphere, as the sole process for stopping the combustion.

In many cases this isolation is difficult to be carried out for many reasons, mostly depending on both metal kind and fire temperature.

Certain metals, such as alkaline metals used as coolants more particularly in nuclear power units, are characterized by:

a very light density when liquid and at the temperatures met during the burnings, i.e. about 0,85 at 600° C. and 0,76 at 800° C. in case of sodium, a lower viscosity of about 0,2 centipoise at 600° C. for sodium.

According to another feature of those alkaline metals at relatively low temperature, i.e. below 400–450° C., the oxyde blanket thus formed partially remains at the surface and somewhat protects the metal in contact with the air, whereas at higher temperatures the oxide layer flows and dissolves within the metal, thus liberates the surface thereof.

Further, sodium and the other alkaline metals wet at molten state most of the fire extinguishing products which, by reasons of the density thereof generally higher than that of the metal, flow and cannot provide any protecting effect on the surface.

Besides, due to the high conductivity of metals during the fires, the whole mass reaches high temperatures, that is not the case of other fuels, such as hydrocarbons, wherein the sole blazing surface is at a relatively high temperature.

The choice of materials which can be used for fighting against metal fires is critical, due to the fact that chemical reactions may occur, taking on account the metal reactivity and the high temperature.

Accordingly most of the organic compounds able to provide cracking products as a source of secondary fires which must be eliminated by using another extinguishing system, must be avoided. Further said compounds may form explosive gaseous mixtures.

Most of mineral compounds, except the alkaline halogenides, especially the sodium ones, and certain inert compounds, such as carbon, are reduced by alkaline metals and light metals, such reduction generally involving highly exothermic reactions which possibly induce prohibitive temperatures able to provoke severe accidents. In certain cases silica and silicates react with violence.

At the present time alkaline halogenides are available as extinguishing powders and the action thereof is efficient on light metal fires. However they have high disadvantages:

they have a considerably corrosive action which may be very detrimental to the industrial plants located close to the fires, when used for extinguishing alkaline metal fires, especially the sodium ones, further difficulties occur due to the fact that said halogenides are wetted by said metals and flow away.

Carbone and the different forms thereof do not react with metals. However, when used for extinguishing the alkaline metal fires, it is easily wetted and also flows away.

Accordingly, use has to be made of an important amount of either alkaline halogenides or carbon (on purpose to fill the whole plenum including the metal) before the formation of an isolating layer.

A main object of the invention is to provide a method of extinguishing metal fires, which enables the metallic surface to be efficiently and simply isolated from the ambient atmosphere, whatever may be the metal kind and the fire temperature.

Another object of the invention is to provide a method of extinguishing metal fires, wherein use is made of a slight amount of products.

These objects are attained according to the present invention by providing a method of extinguishing metal fires, characterized in that the metallic surface is isolated from the ambient atmosphere by means of exfoliated graphite, possibly formed "in situ".

It is already known that natural graphite flakes are capable to adsorb under certain conditions many chemical elements and compounds, or mixtures thereof, which insert themselves between the laminae of the graphite network, so as to form complexes.

The obtention process of such graphite complexes has to be adapted to the nature of the material or materials to be inserted. It generally consists to react the relative material or materials with natural graphite flakes, possibly in the presence of elements or compounds promoting such an insertion in selected conditions of temperature and pressure for a predetermined period of time, whereupon the product thus obtained is possibly subjected to the action of a solvent (such as water, alcohols and so on).

One can thus obtain a graphite-sulfuric acid complex by reacting natural graphite with a sulfonitric mixture, whereupon the graphite thus treated is washed with water.

Some of said complexes have the property of exfoliating when they are subjected suddenly to a high temperature and as a result provide graphite having a low density, i.e. the exfoliated graphite.

According to the invention, this exfoliated graphite may be used as such, either compacted under slight pressure as granules or formed "in situ" within the temperature ranges of the relative metal fires.

On purpose to prepare exfoliated graphite, various complexes or mixtures thereof may be used.

Examples of such complexes are the complexes obtained starting from graphite and:

nitric acid ($HNO_3$)
sulfuric acid ($H_2SO_4$)
hydrofluoric acid (HF)
orthophosphoric acid ($H_3PO_4$)
ferric chloride ($FeCl_3$)
trifluoroacetic acid ($CF_3CO_2H$)
ferric chloride/ammonia ($FeCl_3$ $NH_3$)
antimony pentachloride ($SbCl_5$)
calcium/ammonia (Ca $NH_3$)
baryum/ammonia (Ba $NH_3$)
strontium/ammonia (Sr $NH_3$)

Some of said complexes subjected to high temperature stresses have an exfoliation ratio ranging from 20 to 300.

Exfoliated graphite poured on blazing metals, for instance light metals such as aluminium and magnesium as well as the alloys thereof, causes said fires to be extinguished when using relatively slight amounts of said graphite.

In the case of alkaline metals, the liquid metal is wet-fixed by the foamed graphite which has a sponge-like action and a graphite amount in excess insures the blanketing and the isolation from the atmosphere. The required amount of exfoliated graphite is proportional to the amount of burning metal, said amount being however slight in respect to the amounts of extinguishing agents commonly used.

In the case of exfoliated graphite formation "in situ", the choice of a complex (or a complex mixture) essentially depends on the kind of the burning metal, on the metal temperature (since it was required that the complex should exfoliate at said temperature) and on the fire environment. The material or materials inserted within the complex cause(s) the exfoliated graphite to be formed "in situ".

According to the invention, one has to select the amount of material to be inserted in the graphite and/or the complex mixture, so as to obtain "in situ" an exfoliated graphite which will be so light as to float on the molten metal, and well-bonded as to form a blanket isolating the metal from the ambient atmosphere. Thus a maximum exfoliation rate providing an exfoliated graphite so light as to be swept by the combustion gas stream is not adapted.

The exfoliation process is carried out at molten metal surface and the exfoliated graphite layer formed thereon "in situ" does not flow away and provides an isolation, while completing the combustion even in the case of alkaline metals. The required amount of graphite complex is substantially slight and only depends in practice on the surface of the molten metal and not on the volume thereof.

In case of sodium fire, the extinguishing process is carried out within a few seconds. The discharge of sodium oxide aerosols is immediately stopped and then the metal temperature slowly decreases, due to the fact that the exfoliated graphite layer is thermic isolating.

According to another advantageous feature, the invention may be processed in an easy manner, taking on account the conditions in which the metal fires may occur.

Thus said processing may be performed by gravity flowing, manual spraying, mechanical spraying, such as by means of an extinguisher, while using either an exfoliated graphite or a graphite able to be exfoliated, by spraying of graphite complex avoidable either in small bags or in capsules, by a spraying process involving an explosive. This list of processes is not limiting.

It has also be found that the graphite product could preferably be conditioned as granules, bars and foils.

Granules may be obtained by a mere compression of the relative complex, such as the blocks obtained hereinafter by the process of examples 16, 17, 18 and 20. One may also use machines for producing tablets. These granules, due to their smaller size, are different from the blocks. They may be cylindrical with a diameter ranging from 6 to 12 mm and a height ranging from 3 to 12 mm. The weight of a granule ranges from 0,2 to 2 grams. Said sizes and weight are not critical, and granules having various shapes and sizes, for instance spherical granules, may be obtained.

It has been discovered, and that is a feature of the invention that, when a certain amount of complex granules are poured on the surface of a sodium fire, each granule, when foaming, repels the neighbouring granules which are themselves foaming, as to provide a considerably quicker blanketing of the surface.

The bars may be obtained and shaped by any convenient moulding process. It is also possible, by a compression process involving a pressure amounting to 200 bars, to prepare plates having a thickness of, for example, 10 mm, whereupon said plates are mechanically cut as to obtain bars.

It has been established that said bars, when disposed on a blazing surface, had the same behaviour as the granules, as to the metal repelling effect thereof that insures a fire blanketing quicker than with more bulky blocks.

Granules and bars may be removably bonded or wrapped as to form more important blocks, the relative bond being either destroyed when contacting the fire, or easily eliminated during the process in case of a wrapper, such as lead foil.

One may also imagine to use compressed thin plates adapted to be disposed on the blazing surface. However, the mechanical strength of such plates is poor, and as a result they are too weak for said use. An object of the invention is to improve the mechanical strength of said plates.

A foil having a sufficient mechanical strength may be obtained by filling a paper or board sheet, according to the paper technology, with a graphite complex powder. Such a sheet when disposed on a sodium fire surface insures the extinction thereof under a few seconds.

Alternately, according to the same paper technology, one may obtain a foil having a sufficient mechanical strength by incorporating to said graphite complex powders uninflammable fibers.

It is also possible to produce such a sheet by a dry process, such as for instance one of those used for producing unwoven fabrics starting from non-flammable fibers.

According to another possible method for producing such a sheet, the complex is agglomerated by means of a carboneous material, such as exfoliated graphite.

Besides, the processing could be preventive, for example:

small bags containing graphite complexes can be disposed within reception chambers provided for recovering liquid metals in case of accidental pouring;

blocks of exfoliated graphite complexes lined or unlined can be used as building elements for receptacles.

The present invention will be more fully apparent from the following non-limiting examples.

In these examples, tests have been carried out in a steel-sheet vat thermally isolated on the lateral and bottom faces thereof by means of exfoliated vermiculite.

The molten metal surface area is about 2,2 dm2, except in examples 18 and 19. The sodium is heated and then ignited by means of a propane torch.

Thermocouples enable the metal temperature to be controlled and registered. The combustion, when no extinction process is carried out, takes place at a speed of about 40 kg/h×m2.

EXAMPLE 1

100 grams of exfoliated graphite granules having a density of 0,05 were manually sprayed on 1 kg of sodium heated at 600° C. and ignited.

As soon as the spraying process is begun, the exfoliated graphite granules are wetted by the sodium and has a sponge-like effect to fix said metal, whereupon they form a blanket on the metal surface, thus isolating said metal from the ambient atmosphere, and as a result the extinction occurs.

The aerosol emission of sodium oxides is immediately stopped and the fire extinction occurs under about ten seconds.

EXAMPLE 2

This example relates to an alternative process of Example 1, while only using a double amount of sodium.

One operates exactly as in Example 1 and it has been established that it was necessary to use 200 g of exfoliated graphite granules having a density of 0,05 as to obtain the complete extinction which occurs in the same manner as in Example 1.

EXAMPLE 3

25 g of ammonia-ferric chloride-graphite complex are once sprayed manually on 1 kg of sodium heated at 600° C. and ignited.

At said temperature, the complex exfoliated as to form exfoliated graphite the particles of which were intermingled at the metal surface as to form a blanket which insured the isolation of said surface from the ambient atmosphere and the complete extinction under about ten seconds.

During said process, ammonium chloride vapours are mainly formed, which evolve in the atmosphere. However said vapours are considerably less corrosive than soda produced by the ignition of sodium.

EXAMPLE 4

One operated in the same conditions as in Example 3, while using 25 g of ammonia-calcium-graphite complex instead of the aforesaid graphite complex.

It was established that complete fire extinction occurred in an analogous manner.

During said process, ammonia vapours discharged in the atmosphere. However said vapours were less detrimental than those produced by sodium ignition.

EXAMPLE 5

One operated in the same conditions as in Examples 3 or 4, while using 25 g of 10% nitric acid-graphite complex.

It was established that complete fire extinction occured in an analogous manner.

During said process, a small amount of nitrous vapours discharged in the atmosphere, but that is less detrimental than soda produced by sodium ignition.

EXAMPLE 6

One operated in the same conditions as in Example 5, while setting the aforesaid complex in a polyethylene bag which was cast on the burning metal.

At fire temperature, the bag burnt and liberated the complex which exfoliated so as to obtain exfoliated graphite which formed an isolating blanket on the metal surface as in the preceeding cases, and extinguished the fire.

EXAMPLE 7

On the bottom of a container was disposed a polyethylene bag containing 25 g of a 10% nitric acid-graphite complex, whereupon 1 kg of burning sodium heated at 600° C. was poured thereinto.

After ignition of the bag, the complex thus liberated exfoliated. The exfoliated graphite particles thus obtained, which had a lower density, and floated on the metal surface so as to finally form thereon an isolating blanket sufficient for extinguishing the fire.

EXAMPLE 8

One operated as in Example 7, while disposing the graphite complex at a certain height from the bottom of the container.

As the burning sodium at 600° C. was in contact with the bag, the same procedure as previously described occured and finally the metal surface was covered with an isolating blanket of exfoliated graphite particles, which extinguished the fire.

EXAMPLE 9

A mass of magnesium turnings (1 kg) was ignited by means of an electric arc and 100 g of exfoliated graphite granules having a density of 0,05 were manually sprayed thereon.

There were immediately formed an isolating blanket and the fire was extinguished.

EXAMPLE 10

One operated as in Example 9, except that 25 g of 10% nitric acid-graphite complex were sprayed instead of exfoliated graphite (100 g).

At the fire temperature, the complex exfoliated so as to form exfoliated graphite the particles of which intermingled at the metal surface, thus forming a blanket which enabled the fire to be isolated from the ambient atmosphere and extinguished.

EXAMPLE 11

One operated as in Example 10, except that the magnesium turnings (1 kg) were substituted by 1 kg of aluminium turnings.

The fire extinguished in analogous manner.

EXAMPLE 12

50 g of 10% sulfuric acid-graphite complex were manually sprayed on 1 kg of sodium heated at 600° C. and ignited. The emission of aerosol of sodium oxides is immediately stopped and the blanketing of the sodium is carried out within 5 seconds, while extinguishing the fire.

EXAMPLE 13

One operated as in Example 12, while only using 25 g of complex. The same observations were made. However certain raisings of burning sodium were observed, that required the addition of a few grams of complex.

EXAMPLE 14

One operated as in Example 12, except that the complex was sprayed by means of an extinguisher especially adapted to said procedure. Use was made of 300 g of complex.

The emission of aerosol of sodium oxides was immediately stopped. The blanketing of the fire was obtained within 3 seconds, while extinguishing said fire.

EXAMPLE 15

One operated as in Example 14. Use is made of 120 g of complex, thus obtaining the same results as previously stated.

EXAMPLE 16

A cylindrical block of sulfuric acid-graphite complex is made by a compression process, wherein use is made of a mould subjected to a pressure of 200 bars. Said block is deposited on 1 kg of sodium heated at 600° C. and ignited. The graphite exfoliation already started so as to obtain a whole blanketing of the fire, which is thus extinguished. The exfoliation process is then pursued for a certain period of time.

EXAMPLE 17

An identical test was then carried out, while using a block provided with holes and finished on one of its sides so as to increase the relative side area.

One obtained the same results. However the blanketing was produced in a quicker period of time, i.e. within 20 seconds.

EXAMPLE 18

Two graphite blocks similar to that used in Example 17 were placed on a fire of sodium (3 kg) burning at 600° C., said fire having a surface area of 3,5 dm2. The fire was extinguished within about 20 seconds.

EXAMPLE 19

Sulfuric graphite complex turnings were sprayed by means of an extinguisher onto a fire of sodium (3 kg) heated at 600° C. and having a surface area of 3,5 dm2. When using 280 g of complex, a part of which being deposited outside the fire, one obtained within about 4 seconds the extinction of said fire.

EXAMPLE 20

A block (100 g) of sulfuric acid-graphite complex similar to that used in Example 16, was jacketed by means of a welded lead sheet having a thickness of 5/10mm. This block was placed on a fire of sodium (1 kg) burning at 600° C. The extinction occured as in the case of Example 16.

EXAMPLE 21

50 g of cylindrically shaped granules (diameter: 8 mm; height: 6 mm) of sulfuric acid-graphite complex were sprayed on a fire (surface area: 2,2 dm2) of sodium (1 kg) heated at 600° C. and ignited. The exfoliating process and the extinction occured under 3 seconds.

EXAMPLE 22

A bundle (100 g) of graphite complex formed of bars having a size: 10 mm×10 mm×100 mm and being bonded by means of either a cotton thread or any inflammable material was deposited on a fire (surface area 3,5 dm2) of sodium (3 kg) heated at 600° C. and ignited. Said inflammable material is immediately ignited so as to free the bars which blanketed the fire area after being exfoliated, thus extinguishing said fire within a shorter period of time.

EXAMPLE 23

A bundle (90 g) of graphite complex formed of bars and wrapped in a welded lead sheet was deposited on a fire of sodium (1 kg) heated at 600° C. and ignited. The fire extinction occured in the same way as previously observed.

EXAMPLE 24

200 g of a bar-shaped graphite complex were preventively disposed in a test vat having a surface area of 3,5 dm2; then 2 kg of sodium previously heated at 600° C. were poured thereinto.

The exfoliating process of the complex occured at the beginning of the pouring process, thus avoiding any general blazing of the sodium mass.

At the end of the pouring process only occured a dropping of burning sodium. The amount of complex used was too important and one observed an overflowing of the carboneous froth out of the receiving vat without any drawing along of metal.

Temperature in the receiving vat began to slowly decrease when the pouring process was completed.

EXAMPLE 25

A board sheet loaded up to 80 g/m2 with cellulose and 2000 glm2 with sulfuric acid complex was made by processing a suitable method according to the paper technology and using a test forming machine. On purpose to be used for the following test, said sheet is cut to the sizes of the fire to be treated.

This sheet is deposited on a fire of sodium (1 kg) at 600° C. After a quick combustion of a small portion of the cellulose, the sheet foamed so as to extinguish said fire.

These examples clearly show the advantage of using exfoliated graphite which may be obtained "in situ", on purpose to extinguish metal fires. Whereas generally use was made of 1 kg of conventional products on purpose to extinguish 1 kg of burning metal, either 100 g of exfoliated graphite or 25 g of graphite complex are sufficient according to the present invention.

Besides if the use of exfoliated graphite has the advantage of not discharging possibly detrimental vapours, the use of graphite complexes further has the two following main advantages:

the storage volume is considerably reduced of at least 20 times;

the engagement of the exfoliated graphite foils obtained "in situ" with themselves and with the container partitions is improved. Accordingly the isolating blanketing thus formed is also improved.

What is claimed as new is:

1. A method for extinguishing a metal fire comprising isolating the burning metallic surface from the ambient atmosphere by application of a product comprising an exfoliable graphite complex wherein the graphite is associated with a complexing material or materials selected from the group consisting of nitric acid ($HNO_3$)
sulfuric acid ($H_2SO_4$)
hydrofluoric acid (HF)
orthophosphoric acid ($H_3PO_4$)
trifluoroacetic acid ($CF_3CO_2H$)
ferric chloride ($Fe\ Cl_3$)
ferric chloride/ammonia ($FeCl_3\ NH_3$)
antimony pentachloride ($SbCl_5$)
calcium ammonia ($Ca\ NH_3$)
barium/ammonia ($Ba\ NH_3$)
strontium/ammonia ($SrNH_3$), and wherein exfoliation occurs when the product is applied to the metal fire.

2. A method as set forth in claim 1, wherein use is made of an extinguisher.

3. A method as set forth in claim 1, wherein the graphite complex to be applied is packaged in bags or capsules.

4. A method as set forth in claim 1, wherein graphite complex packaged in bags is deposited in containers provided for recovering the molten metals in case of accidental overflowing.

5. A method as set forth in claim 1, wherein said graphite complex is applied by means of graphite complex blocks which are coated or uncoated and may be used as building elements of a part of the container.

6. A method as set forth in claim 4, wherein said graphite complex blocks are jacketted by means of a sheet of a material selected among the group consisting of easily melted metals and plastics.

7. A method as set forth in claim 6, wherein use is made of a lead sheet.

8. A method as set forth in claim 1, wherein the graphite complex is applied by explosive spraying.

9. A method as set forth in claim 1, wherein graphite complex is applied as granules or small blocks able to become self-repellent during the exfiolation process so as to blanket in a quicker manner the fire surface.

10. A method as set forth in claim 1, wherein the graphite complex is applied as a sheet.

11. A method as set forth in claim 1, wherein the fire is an alkaline metal fire.

12. A method as set forth in claim 11, wherein the alkaline fire is a sodium fire.

13. A method as set forth in claim 1, wherein the fire is a light metal fire.

14. A method as set forth in claim 18, wherein the light metal is magnesium, aluminium or an alloy thereof.

15. A metal fire extinguishing product comprising an exfoliable graphite complex wherein the graphite is associated with a complexing material or materials selected from the group consisting of nitric acid ($HNO_3$)
sulfuric acid ($H_2SO_4$)
hydrofluoric acid (HF)
orthophosphoric acid ($H_3PO_4$)
trifluoroacetic acid ($CF_3CO_2H$)
ferric chloride (Fe $Cl_3$)
ferric chloride/ammonia ($FeCl_3$ $NH_3$)
antimony pentachloride ($SbCl_5$)
calcium ammonia (Ca $NH_3$)
barium/ammonia (Ba $NH_3$)
strontium/ammonia (Sr $NH_3$), and is exfoliable when the product is applied to the metal fire.

16. An extinguishing product as set forth in claim 15, comprising an exfoliable graphite complex shaped as granules or small blocks able to become self-repellant during the exfoliation process, so as to blanket in a quicker manner the fire surface.

17. An extinguishing product as set forth in claim 15, comprising a sheet including the exfoliable graphite complex, said sheet being made in accordance with the paper technology.

18. An extinguishing product as set forth in claim 17, wherein said sheet further contains board or paper components.

19. An extinguishing product as set forth in claim 15, comprising a sheet containing the exfoliable graphite complex and obtained according to the unwoven fabrics technology.

20. An extinguishing product as set forth in claim 19, wherein a non-flammable fiber is added to said graphite complex.

21. An extinguishing product as set forth in claim 15, comprising a sheet in which the exfoliable graphite complex is agglomerated by means of a carbonous material.

22. An extinguishing product as set forth in claim 21, wherein said carbonous material is exfoliable graphite.

* * * * *